United States Patent Office 3,341,346
Patented Sept. 12, 1967

3,341,346
PROCESS FOR THE PREPARATION OF CADMIUM YELLOW PIGMENTS
Louis J. Gagliano and Edward L. Moore, Glens Falls, N.Y., assignors to Hercules Incorporated, a corporation of Delaware
No Drawing. Filed Feb. 13, 1964, Ser. No. 344,551
15 Claims. (Cl. 106—293)

ABSTRACT OF THE DISCLOSURE

Cadmium yellow pigments are prepared by calcining, in a nonoxidizing atmosphere, a mixture of zinc and cadmium sulfides, a nonsulfide material selected from the group consisting of cadmium oxide, zinc oxide, mixtures of cadmium and zinc oxides, and materials capable of yielding such a nonsulfide material under the conditions of the calcination, and uncombined sulfur.

---

This invention relates to the production of cadmium yellow pigments and more particularly to a process for producing pigments of this type having an aggregate of improved properties not heretofore obtainable.

The process in use heretofore for the production of cadmium yellow pigments embodies two principal steps. The first of these consists of the coprecipitation of the sulfides of zinc and cadmium from a solution of their soluble salts. The second consists of a calcination of the precipitated material in a restricted or nonoxidizing atmosphere in order to bring about inversion from the cubic to the hexagonal crystalline structure.

The pigments produced by this process are very expensive compared to other inorganic yellow pigments and hence have not found extensive commercial use. They do, however, possess outstanding alkali resistance and heat stability and have, therefore, found acceptance where these properties are of appreciable importance. It has long been apparent that if commercial use of these pigments is to be expanded an improved product must first be developed.

An important object of the present invention, therefore, is the provision of a process for the production of cadmium yellow pigments having greater strength, gloss and transparency than pigments of this type made by the prior art process described above.

Another object of the invention is the attainment of these improvements in quality while maintaining equal brightness and cleanness in regard to hue and other desirable characteristics of the pigments.

In accordance with the invention, the above and other objects are attained by the calcination, in a restricted or nonoxidizing atmosphere of mixtures of zinc and cadmium in combination as both sulfides and oxides or sulfides and materials capable of yielding oxides under the conditions of calcination and uncombined sulfur. Cadmium yellow pigments prepared in this manner are much stronger than many of the best cadmium yellow pigments found in commerce. In addition, they show increased gloss which makes them advantageous for use in printing inks and increased transparency which is advantageous in applications such as plastics and synthetic fibers.

Having described the invention generally, the following examples are given to illustrate specific embodiments thereof.

*Example 1*

Four hundred ml. of a solution containing a total of 73.6 g. of barium hydroxide were added to 818 ml. of a solution containing 421 g. of cadmium nitrate. This was followed by the addition of 226 ml. of a solution containing 81.3 g. of zinc nitrate and then in turn by the addition of 1400 ml. of a solution containing 305 g. of barium sulfide and 13.8 g. of sulfur. The precipitated material resulting from the combination of these solutions was recovered by filtration, washed free of soluble salts in the filter and dried. The dried material was calcined at 900° F. yielding a primrose cadmium yellow concentrate.

Comparison of this color against commercially available colors of similar hue showed it to be 40% stronger, of much decreased opacity and to give much higher gloss or finish in a dried ink.

*Example 2*

Material prepared identically with that of Example 1 except that it was calcined at 800° F. instead of at 900° F. produced a pigment having properties like those of the pigment produced in Example 1.

*Example 3*

Material prepared identically with that of Example 1 except that it was calcined at 1100° F. instead of at 900° F. produced a pigment having properties like those of the pigment produced in Example 1.

*Example 4*

Four hundred ml. of a solution containing 35.2 g. of barium hydroxide were added to 818 ml. of a solution containing 421 g. of cadmium nitrate. This was followed by the addition of 190 ml. of a solution containing 81.3 g. of zinc nitrate and then in turn by the addition of 1560 ml. of a solution containing 340 g. of barium sulfide and 7 g. of sulfur. The precipitated material resulting from the combination of these solutions was recovered by filtration, washed free of soluble salts in the filter and dried. The dried material was calcined at 850° F. and produced a pigment of like properties to those of the pigment produced in Example 1.

*Example 5*

A liter of solution containing 176.2 g. of barium hydroxide was added to 854 ml. of a solution containing 421 g. of cadmium nitrate. This was followed by the addition of 215 ml. of a solution containing 81.3 g. of zinc nitrate and then in turn by the addition of 953 ml. of a solution containing 201 g. of barium sulfide and 49.5 g. of sulfur. The precipitated material resulting from the combination of these solutions was recovered by filtration, washed free of soluble salts in the filter and dried. The dried material was calcined at 900° F. and produced a pigment of like properties to those of the pigment produced in Example 1.

*Example 6*

A solution containing 7 g. of barium hydroxide in a total of 400 ml. of solution was added to 994 ml. of a solution containing 485 g. of cadmium nitrate. This was followed by the addition of 18 ml. of a solution containing 7.8 g. of zinc nitrate and then in turn by the addition of 1608 ml. of a solution containing 347 g. of barium sulfide and 1.31 g. of sulfur. The precipitated material resulting from the combination of these solutions was recovered by filtration, washed free of soluble salts in the filter and dried. The dried material was calcined at 850° F. yielding an orange-yellow pigment. Comparison of this color against a commercially available color of similar hue showed it to be 20% stronger, of much decreased opacity and to give much higher gloss or finish in a dried ink.

*Example 7*

A 13 g. quantity of sulfur was dissolved in 1387 ml. of a solution containing a total of 302 g. of barium sulfide.

This was in turn added to 824 ml. of a solution containing 421 g. of cadmium nitrate. A total of 35 g. of anhydrous zinc oxide were then mixed into the slurry resulting from the above combination of solutions and the total solids recovered by filtration, washed free of soluble salts in the filter and dried. The material was calcined at 900° F. to yield a pigment of deep yellow hue.

*Example 8*

Six grams of sulfur were admixed with 100 g. of finished color produced similarly to that produced in Example 1 except that no sulfur was included. This mixture was then heated in a shallow dish, opened to the atmosphere, for a period of 30 minutes at 800° F.

The material so produced gave rise to a cleaner more opaque color than the original when incorporated in an ink and without loss of tinting strength.

The process of the invention thus involves calcining a mixture of cadmium and zinc in combination as sulfides and oxides or sulfides and materials capable of yielding oxides under the conditions of calcination, and uncombined sulfur. It is preferred to use mixtures containing cadmium and zinc sulfides and a compound or compounds of zinc and/or cadmium, since upon conversion to the sulfide, these materials have the potential of becoming an integral part of the completed pigment. Suitable zinc and/or cadmium compounds of this type are the hydroxides, the carbonates and the oxides or the material formed when soluble salts, e.g., the sulfates and/or nitrates, of one or both of these metals are reacted with at least one compound selected from the group consisting of aluminates, silicates, hydroxides and carbonates of alkali metals, alkali earth metals and ammonia.

These calcination mixtures are preferably prepared by coprecipitating the sulfides of zinc and cadmium from water-soluble salts of these metals such as the sulfates and/or nitrates by reacting an aqueous mixture of such a water-soluble salt with a water-soluble sulfide selected from the group consisting of alkali metal and alkali earth metal, sulfides, e.g., sodium sulfide, barium sulfide, etc., and the oxide-forming compounds of zinc and cadmium from compounds such as the hydroxides of barium and sodium, the carbonates of sodium and ammonia, and the aluminates and silicates of sodium by reacting such a compound of sodium, barium or ammonia with water-soluble salts of zinc and/or cadmium. If desired, an equivalent amount of zinc oxide can be substituted for both the zinc nitrate and the barium hydroxide or similar compound as shown in Example 7. The sulfur can be added to the mixture before calcination or after the mixture has been subjected to at least a partial calcination treatment. It is preferred to add the sulfur before calcination.

A very satisfactory procedure for forming these calcination mixtures is illustrated in Examples 1–6 wherein an aqueous solution containing barium sulfide and sulfur is added to an aqueous mixture containing zinc nitrate, cadmium nitrate, and barium hydroxide. The precipitated material resulting from the combination of these ingredients is then recovered, as by filtration, washed free of soluble salts and dried. These coprecipitations can be carried out at atmospheric temperatures and pressures or under any condition of temperature and pressure which permits the initial materials being employed to be in solution at the concentrations at which they are used.

In a modified procedure, the ingredients can be combined by mechanical mixing. For example, the oxides, hydroxides or carbonates of zinc and/or cadmium, together with sulfur, can be added to the sulfides of zinc and/or cadmium or a combination of both by mixing in a tank equipped with mechanical agitation, a pebble mill, a conical blender or other suitable equipment depending on whether it is sought to combine the materials as slurries, pulps or dry powders or a combination of these forms. Such mixing can be carried out at atmospheric temperature and pressure or any variations thereof which will produce essentially the same result.

The calcination mixture, formed as above described or in other suitable manner, is then calcined in a restricted atmosphere which is, at least, nonoxidizing in nature, but which more preferably is of a reducing nature such as atmospheres composed primarily of such gases as $N_2$, $SO_2$, $CO$ and $NH_3$ or their dissociation products. Any suitable form of calcining apparatus which will effect a transfer of heat to the material undergoing reaction in sufficient quantity to bring about a reaction between the uncombined sulfur and the nonsulfide material present and to insure the hexagonal crystalline structure in the final product can be used. In one form of calcining apparatus of the rotary type which was found satisfactory for use herein, the benefits ascribed to the present invention were obtained at firing temperatures ranging from about 800° F. to about 1100° F. for from about 30 minutes to about 2 hours. Preferred operating temperatures and time for this type of apparatus and procedure are from about 850° F. to about 950° F. and from about 40 minutes to about 60 minutes. It will be appreciated, of course, that there may be some variation within, as well as from, these ranges of temperatures and times when a different type of calcining apparatus is used.

Where the sulfur is included in the calcination mixture before calcining begins, the calcination can be carried out in one step as above described. However, if the sulfur is added after calcining begins, a further calcination or heat treatment is required to bring about a reaction between the sulfur and the nonsulfidic forms present in the mixture. This additional calcination treatment is carried out at temperatures and for times sufficient to complete the desired reactions and to insure the hexagonal crystalline structure in the final product. In general temperatures within the ranges recited above can be used. However, if the sulfur is added near or at the end of the calcination treatment above described, the subsequent treatment can be carried out at lower temperatures, i.e., from about 500° F. to about 700° F., and open to the atmosphere.

The zinc to cadmium ratio utilized herein is determined by the shade of yellow it is sought to produce. Thus, to produce the lighter shades of yellow, the zinc to cadmium ratio should be increased. Conversely, for production of the darker shades of yellow, the zinc to cadmium ratio should be decreased. The preferred ratio of zinc to cadmium is from about 0.428:1 to about 0.018:1.

Having selected the zinc to cadmium ratio, the remaining ingredients of the mixture for calcination can be formulated over a broad range of possibilities. However, as a practical matter, various manipulative difficulties may arise when the combined amounts of uncombined sulfur and the nonsulfidic material, i.e., the zinc and/or cadmium oxide or material capable of forming same under the conditions of the calcination, exceed about 69 mol percent of the total mixture. In view of this fact, and since no advantage is gained by further increasing these materials beyond the indicated amount, this is taken as the upper limit of these materials to be used in the calcination mixtures of the invention.

The minimum amount of uncombined sulfur and nonsulfide material approaches zero as a limit. In general some improvement in pigment properties is obtained when these materials are present in any quantity. However, in general, they will be present to the extent of at least 1 mol percent. It is preferred to use at least about 3 mol percent and not more than about 47 mol percent based on the total mixture.

Since the remainder of the calcination mixture consists of the sulfides of zinc and cadmium, these sulfides will be present in amounts varying from about 31 mol percent to about 99 mol percent of the total mixture. Preferred amounts will be from about 53 mol percent to about 97 mol percent of the total mixture.

Having determined the total amount of uncombined sulfur and nonsulfide material, which can be present in the calcination mixture, it now becomes necessary to determine the relative amounts of each. This involves a number of considerations. Thus, at a fixed level of sulfur, decreasing the amount of interacting nonsulfide material below the amount necessary to consume the available sulfur results in a lessening of strength, gloss and transparency from the optimum amounts achievable. Conversely, increasing the amount of interacting compound above the amount necessary to consume the available sulfur results in an oxidic residue remaining in the color. When the hydroxides, carbonates and oxides of zinc and cadmium are used, as the nonsulfide compound, the material remaining will be an oxide of one of these elements. Cadmium oxide, owing to its brown coloration, produces a dirtying effect upon the hue of the pigment, and although zinc oxide is not objectionable in this regard, if it be present as an additional phase, it could serve as an extender, thereby reducing the strength of the color.

For the above reasons, it is desirable, though not essential, that the ratio of nonsulfide material to uncombined sulfur be not less than about 1:1 and not greater than about 1.5:1. From the preceding discussion relating to mole percent it is clear that the above ratio refers to a mole ratio. It is preferred to so proportion the interacting materials that the calcination leaves only the sulfides of zinc and cadmium in the completed pigment. One method for doing this which has been found to produce near optimum results is that illustrated by Example 1 in which the initial material present as the sulfide is the molecular equivalent of the cadmium, and both the uncombined sulfur and the hydroxide (the nonsulfide material) supplied for reaction with it are the molecular equivalent of the zinc. It should be further noted, however, as illustrated by Examples 4 and 5 that the uncombined sulfur may be varied from amounts less than that having molecular equivalence with the zinc to amounts representing considerably more than molecular equivalence with the zinc. It is also apparent from these examples, that the relationship between the uncombined sulfur and the material included for reaction with it may be varied from one of molecular equivalence.

The primary advantages of the present invention over the prior art lies in its ability to increase or intensify certain of the properties of the finished pigment, such as strength, gloss and transparency, relative to pigments produced by the prior art method. Strength increases over the prior art method range from 20% to 40% and the pigments have greatly reduced opacity and exhibit much higher gloss or finish in dried inks.

The pigment colors produced according to this invention have properties which adapt them for use in printing inks, plastics and pigment dyed textile fibers. Thus, high gloss is a very desirable feature in printing inks, and since these pigments give rise to many times the gloss of similar pigments found in commerce, they are well suited to this use. Also, pigments of lower opacity produce much more attractive coloring effects in transparent or translucent media such as plastics and synthetic fibers. The several times greater transparency of the pigments produced by the present invention makes them well suited for such uses. And, finally, the 20% to 40% greater strength of these pigments makes them of greater benefit than the present pigments of commerce in any usage owing to much improved economy.

What we claim and desire to protect by Letters Patent is:

1. The process of preparing cadmium yellow pigments which comprises calcining, in a nonoxidizing atmosphere, a mixture of zinc and cadmium sulfides with a nonsulfide material selected from the group consisting of (1) the oxides, hydroxides and/or carbonates of cadmium and/or zinc, and (2) the precipitation products formed when water-soluble salts of at least one metal selected from the group consisting of zinc and cadmium are reacted with at least one compound selected from the group consisting of aluminates, silicates, hydroxides and carbonates of alkali metals, alkali earth metals and ammonia, the mole ratio of nonsulfide material to sulfur being from about 1:1 to about 1.5:1, and the temperature of calcination being such as to bring about reaction of the sulfur and nonsulfide material and to insure a hexagonal crystalline structure in the pigment, and uncombined sulfur, the sulfides of zinc and cadmium constituting from about 31 mol percent to about 99 mol percent of said mixture and the nonsulfide material and uncombined sulfur constituting from about 1 mol percent to about 69 mol percent of said mixture.

2. The process of claim 1 in which the sulfides of zinc and cadmium constitute from about 53 mole percent to about 97 mole percent of said mixture and the uncombined sulfur and said nonsulfide material constitute from about 3 mol percent to about 47 mol percent of said mixture.

3. The process of claim 2 in which the material present in said mixture as sulfide is approximately the molecular equivalent of the cadmium, and both the uncombined sulfur and the nonsulfide material are approximately the molecular equivalent of the zinc.

4. The process of preparing cadmium yellow pigments which comprises reacting an aqueous mixture of water-soluble salts of zinc and cadmium, a water-soluble sulfide selected from the group consisting of alkali metal and alkali earth metal sulfides, a water-soluble nonsulfide material selected from the group consisting of aluminates, silicates, hydroxides and carbonates of alkali metals, alkali earth metals and ammonia, and sulfur, separating the solids from the liquids, and then calcining said solids under nonoxidizing conditions, the proportions of ingredients being such that the solids subjected to calcination contain from about 31 mol percent to about 99 mol percent of sulfides of zinc and cadmium and from about 1 mol percent to about 69 mol percent of nonsulfide material and sulfur, the mole ratio of nonsulfide material to sulfur being from about 1:1 to about 1.5:1, and the temperature of calcination being such as to bring about reaction of the sulfur and nonsulfide material and to insure a hexagonal crystalline structure in the pigment.

5. The process of claim 4 in which the water-soluble sulfide is sodium sulfide.

6. The process of claim 4 in which the water-soluble sulfide is barium sulfide.

7. The process of claim 4 in which the water-soluble sulfide is ammonium sulfide.

8. The process of claim 4 in which the water-soluble nonsulfide material is sodium hydroxide.

9. The process of claim 4 in which the water-soluble nonsulfide material is barium hydroxide.

10. The process of claim 4 in which the water-soluble nonsulfide material is sodium carbonate.

11. The process of claim 4 in which the water-soluble nonsulfide material is ammonium carbonate.

12. The process of claim 4 in which the water-soluble nonsulfide material is sodium aluminate.

13. The process of claim 4 in which the water-soluble nonsulfide material is sodium silicate.

14. The process of preparing cadmium yellow pigments which comprises reacting an aqueous mixture of a water-soluble salt of cadmium, zinc oxide, a water-soluble sulfide selected from the group consisting of alkali metal and alkali earth metal sulfides, and sulfur, separating the solids from the liquids, and then calcining said solids under nonoxidizing conditions, the proportions of ingredients being such that the solids subjected to calcination contain from about 31 mol percent to about 99 mol percent of sulfides of zinc and cadmium and from about 1 mol percent to about 69 mol percent of nonsulfide material and sulfur, the mole ratio of nonsulfide material to sulfur being from about 1:1 to about 1.5:1, and the temperature of calcination being such as to bring about reaction of the sulfur and nonsulfide material and to insure a hexagonal crystalline structure in the pigment.

15. The process of preparing cadmium yellow pigments which comprises reacting an aqueous mixture of water-soluble salts of zinc and cadmium, a water-soluble sulfide selected from the group consisting of alkali metal and alkali earth metal sulfides, a water-soluble nonsulfide material selected from the group consisting of aluminates, silicates, hydroxides and carbonates of alkali metals, alkali earth metals and ammonia, separating the solids from the liquids, calcining said solids under non-oxidizing conditions at temperatures from about 800° F. to about 1100° F., adding sulfur, and calcining the resulting mixture at temperatures from about 500° F. to about 700° F., the proportions of ingredients being such that said resulting mixture subjected to calcination contains from about 31 mol percent to about 99 mol percent of sulfides of zinc and cadmium and from about 1 mol percent to about 69 mol percent of nonsulfide material and sulfur, the mole ratio of nonsulfide material to sulphur being from about 1:1 to about 1.5:1.

References Cited

UNITED STATES PATENTS

| | | | |
|---|---|---|---|
| 2,406,472 | 8/1946 | Nerlinger | 106—301 |
| 2,500,958 | 3/1950 | O'Brien | 106—301 |
| 2,605,167 | 7/1952 | O'Brien | 106—301 |
| 3,220,868 | 11/1965 | Flasch | 106—301 |

FOREIGN PATENTS 856,428  12/1960  Great Britain.

TOBIAS E. LEVOW, *Primary Examiner.*

S. E. MOTT, *Assistant Examiner.*

UNITED STATES PATENT OFFICE
CERTIFICATE OF CORRECTION

Patent No. 3,341,346                         September 12, 1967

Louis J. Gagliano et al.

It is hereby certified that error appears in the above numbered patent requiring correction and that the said Letters Patent should read as corrected below.

Column 6, line 8, beginning with "monia, the mole" strike out all to and including "of said mixture." in line 17, same column 6, and insert instead the following:

> monia, and uncombined sulfur, the sulfides of
> zinc and cadmium constituting from about 31
> mol % to about 99 mol % of said mixture and
> the nonsulfide material and uncombined sulfur
> constituting from about 1 mol % to about 69 mol
> % of said mixture, the mol ration of nonsulfide
> material to sulfur being from about 1:1 to about
> 1.5:1, and the temperature of calcination being
> such as to bring about reaction of the sulfur
> and nonsulfide material and to insure a hexagonal
> crystalline structure in the pigment.

Signed and sealed this 24th day of September 1968.

(SEAL)
Attest:

EDWARD M.FLETCHER,JR.                    EDWARD J. BRENNER
Attesting Officer                        Commissioner of Patents